United States Patent [19]

Psyras et al.

[11] 3,745,746

[45] July 17, 1973

[54] DEHYDRATION PROCESS

[75] Inventors: Hippocrates G. Psyras, Berkeley Heights, N.J.; Arthur Angelo Bellisio, Huntington Station, N.Y.

[73] Assignee: GAF Corporation, New York, N.Y.

[22] Filed: Mar. 25, 1971

[21] Appl. No.: 127,943

[52] U.S. Cl. ................................................ 55/31
[51] Int. Cl. ........................................... B01d 53/14
[58] Field of Search ........... 55/29–32, 68, 73, 48, 51

[56] References Cited
UNITED STATES PATENTS

| | | |
|---|---|---|
| 3,492,788 | 2/1970 | Hochgesand et al. ................ 55/48 |
| 3,589,104 | 6/1971 | Panzarella ............................. 55/32 |
| 2,225,959 | 12/1940 | Miller .................................... 55/30 |
| 3,321,890 | 5/1967 | Barnhart ............................... 55/32 |

*Primary Examiner*—Charles N. Hart
*Attorney*—Walter C. Kehm and Samson B. Leavitt

[57] ABSTRACT

A method of dehydrating gases using N-alkyllactams is described. Included are steps for the recovery of any entrained vapors of the N-alkyllactams from the dehydrated gas streams and the recirculation of the recovered lactams thus reducing the operating cost of such process.

18 Claims, 2 Drawing Figures

DEHYDRATION PROCESS

RELATED APPLICATIONS

This application is related to U.S. Patent application Ser. No. 128,075 concurrently filed which describes a process for the recovery of N-alkyllactams entrained in gas streams treated therewith, said concurrently filed application being also filed by us.

FIELD OF THE INVENTION

This invention relates to process for the dehydration of gas streams and more particularly to the use and recovery of N-alkyllactam solvents used in such processes.

BACKGROUND OF THE INVENTION

Gases at various stages of processing or transportation contain water vapor entrained and admixed therein. Natural gas, for example, as it flows from the wellhead contains considerable quantities of water vapor, and such natural gases often have dewpoints within 10° or 15° F. of the ambient temperature. Due to expansion, processing and/or other handling requirements during treatment and transportation of the gases, there arise problems when the gases are cooled below the dewpoint. The water vapor is transformed to liquid water and/or often to ice. Such a transformation to liquid or solid phases of the water in the pipeline reduces the flow space and tends to clog those operating parts designed to handle gas flow. In addition, water reacts with some of the components in the gas to form solid hydrates of these gas components. Such hydrates tend to deposit at and to freeze or clog the chokes, valves, pistons and other necessary operating devices along the pipeline or at treatment plants.

In the past, dehydration processes have been developed based on the chemical or physical absorption of water by solids or liquids. Silica gels are among the solids used for physical water absorption. Glycols and particularly di- and tri- and tetraethylene glycols have been the more common liquid physical absorbents for water from fuel gases. The silica gels require considerable heat for regeneration and for efficient use. The glycols, due to their viscosity, have low tray efficiencies and, therefore, require considerable expenditure of power for the recirculation and regeneration of large amounts of these viscous liquids needed to achieve desired reductions in the dewpoint.

Accordingly, it is desirable to provide a process that will have the capability of reducing the water vapor content of gases with minimum power and heat requirements for the recirculation of the dehydrating liquids and having a simple system for the recovery and regeneration of these liquids.

THE INVENTION

We have discovered that reductions of dewpoints in gases of about 70° – 80° F. can be achieved by a dehydrating process based upon the injection of liquid N-alkyllactams into the flow path of the wet gas, permitting the liquid N-alkyllactam, as solvent and/or physical absorbent to contact and to come to equilibrium with the water vapor content of the gas stream and the collecting of the liquid equilibrium mixture of the N-alkyllactam and its content of water. The effluent dried gas then is further treated by injection of an absorber liquid which is a solvent for said lactam having a boiling point higher than that of the lactam to recover portions of the lactam vaporized and/or entrained by the dried gas stream. The N-alkyllactam equilibrium mixture and the absorber liquid with its absorbed N-alkyllactam are collected individually or together, the water and other absorbents removed therefrom to reconcentrate and regenerate the N-alkyllactam and the absorber liquid are then recycled in the process of this invention. The water and other absorbed materials may be discarded or utilized where expedient to do so.

The preferred liquid N-alkyllactams in the process of our invention, particularly for the treatment of natural gas and similar hydrocarbon-containing fuel gases is N-methyl pyrrolidone. However, other liquid N-alkyllactams, including N-methyl piperidone and N-cyclohexyl pyrrolidone, may also be used.

The capacity of liquid N-alkyllactams to absorb water had previously been noted in connection with gas-sweetening processes where N-methyl pyrrolidone is the solvent in the preferred sweetening process. A routine loss of up to 30–100 kg./hour depending upon temperature of this solvent by entrainment had been noted when such sweetening plants operated at normal process rates of about 4,000,000 standard cubic feet/hour. To reduce such losses to 3 kg./hour per MMscf, the gases flowing from these prior art sweetening operations are treated with water to reduce the losses of N-methyl pyrrolidone and consequently any dehydration effect is lost in the dehydration to recover the N-methyl pyrrolidone. For sweetening processes, the 3 kg. loss of N-methyl pyrrolidone/MMscf, although high, was tolerated. For gas dehydration processes, the prospects of such losses are prohibitive when compared to costs for presently used processes based on di- and triethylene glycols. Glycol processes, which can achieve the dewpoint depression available with the N-alkyllactam of this invention, have been favored by the low costs of the glycols.

We have discovered that by introducing an efficient recovery stage for the N-alkyllactam after the initial dehydration stage that it is possible to almost completely eliminate losses of the lactam. Further, our discovery permits us to reduce the costs of dehydration with such materials to provide dried gases from our dehydration process with substantially lower dewpoints at reduced pumping, power, tower, construction and similar costs as compared to presently favored processes.

The use of liquid N-alkyllactams as dehydrating agents permits dewpoint depressions up to about 80° F. Small amounts of the lactam that are entrained in the gas stream are then absorbed by the absorption stage of our invention wherein there is introduced into the dehydrating gas stream, an absorber liquid, which is a solvent for the lactam and has a higher boiling point than the lactam.

While the preferred selective dehydrating material in accordance with the process of the present invention is N-methyl pyrrolidone, the general group of acceptable dehydrating agents in accordance with this invention include the liquid N-lower alkyllactams and preferably the N-lower alkyl pyrrolidones. While N-methyl pyrrolidone is in particular preferred, a secondary preferred dehydration agent is N-cyclohexyl pyrrolidone.

The liquid N-alkyl pyrrolidones and piperidones employed in accordance with the process of the present invention are lactams of the $\gamma$- and $\delta$-amino acids derived from butyric acid, valeric acid and caprylic acid.

Such substances are cyclic acid amides. They are neutral and therefore act in accordance with the present invention as physically dissolving absorbents for water and incidentally for certain of the acidic components of natural gases including $H_2S$ and carbonyl sulfide. Generally, the lower alkyl groups in the ranges from one to about seven carbon atoms, including the cycloalkyls such as N-cyclohexyl are preferred over the longer carbon-chain alkyl groups as N-alkyl substituents on the lactams. Among the desirable dehydrating agents for this invention are N-methyl pyrrolidone, N-propyl pyrrolidone, N-isopropyl pyrrolidone, N-p-butyl pyrrolidone, N-n-butyl pyrrolidone, N-n-hexyl pyrrolidone, N-cyclohexyl pyrrolidone, N-methyl piperidone, N-ethyl piperidone, N-propyl piperidone and N-isopropyl piperidone.

In accordance with the further step in the process of this invention, the N-alkyllactams entrained by the natural gas are removed from the gas stream by an absorber liquid which is a solvent therefor. This absorber solvent should have a higher boiling point than the primary dehydrating agent. A difference in boiling points sufficient to permit ease of separation of the lactam from the absorber are required, with at least 25° C. desirable, but 50° C. preferred. However, in properly designed stills, differences of less than 25° C. may be tolerated.

While it is useful to have the absorber liquid for the N-alkyllactam, a compound which is also a dehydrating agent, such a property is not necessary. The absorber should preferably be one having a physical solvency for the liquid N-alkyllactam in order that it be completely miscible therewith so that it may more completely absorb maximum amounts of the N-lower alkyllactam entrained in the gas stream. Preferred among the solvents are di-, tri- and ethylene glycols and the N-alkyllactams. When the lower boiling liquid N-alkyllactams are the primary dehydrating agents, particularly N-methyl pyrrolidone, N-cyclohexyl pyrrolidone has been found to be a useful absorber liquid therefor in the absorber stage. Substantially all of the entrained N-methyl pyrrolidone is recovered by the N-cyclohexyl pyrrolidone from the gas stream for recycling. Other suitable absorber liquids meeting the criteria set forth above for the efficient recovery of the N-lower alkyllactams used as the primary dehydrating agents of this invention are:

Nitrobenzene
Diethylene glycol
Monoethers of diethyleneglycol
Diethers of diethylene glycol
Dibutyl phthalate
Trichlorobenzene
Butyl carbitols
2-phenoxyethanol
Triethanolamine
Napthalene
Acetamide
Indole
Quinoline
Glycerine
1,2,3,4,tetrahydro-2-naphthol
Liquid low molecular weight polyethylene glycols
Dimethyl ethers of polyethylene glycols
Dialkylethers of glycols and glycerol which are liquid at temperatures below about 200° C. including the methyl and ethyl ethers of propylene and polypropylene glycols
Liquid propylene and polypropylene glycols
N-alkyl bis pyrrolidones
1-6 bis N-pyrrolidyl hexamethylene
N-n-octyl pyrrolidone
1-3 N-pyrrolidyl butane
N-n-decyl pyrrolidone
N-undecyl pyrrolidone
N-dodecyl pyrrolidone
N-tetradecyl pyrrolidone
N-hexadecyl pyrrolidone
N-n-hexyl piperidone
N-n-octyl piperidone
N-isooctyl piperidone
N-n-decyl piperidone
N-undecyl piperidone
N-dedecyl piperidone
N-tetradecyl piperidone
N-hexadecyl piperidone It is of interest and value, at this point, to show in Table 1, the high-pressure equilibrium for various hydrocarbons and acid gas components in two particular pyrrolidones:

TABLE 1

CONDITIONS: 800 PISG 80°F.

| Gaseous Component | $K = y/x$ Values Anhydrous n-methyl-2-pyrrolidone | Anhydrous n-cyclohexyl-2-pyrrolidone |
|---|---|---|
| Methane | 18.0 | 7.2 |
| Ethane | 3.5 | 2.12 |
| Propane | 1.7 | 0.77 |
| Carbon Dioxide | 2.3 | 1.22 |
| Hydrogen Sulfide | 0.19 | 0.19 |

Notes:
$K = y/x$
$y$ = Mole Fraction in Vapor Phase
$x$ = Mole Fraction in Equilibrium Liquid Phase Losses of the methyl pyrrolidone, by utilizing this invention, have been reduced to 1–10 percent of the losses previously noted in prior sweetening processes.

The absorber stage of this invention unexpectedly provides an added dividend in that often the second treatment extracts some additional water associated with the N-methyl pyrrolidone vapors so that the dewpoint of the dried gas emerging from the second stage is additionally depressed by about 10° F. In other words, the preferred process of our invention results in a gas dehydration process that routinely yields dewpoint depressions in the treated gases of 70°–90° F. with minimal losses of the treating materials. For example, gases emerging from the wellhead at 60°–70° F. routinely have their dewpoints depressed to below −10° F. after the first stage of dehydration and upon completion of the full treatment with the process of this invention have final dewpoints as low as −20° F. Natural gases having such low dewpoints do not cause problems due to icing or hydrate-formation associated with water vapor and consequently are not subject to the pipeline surcharges applicable to gases having dewpoints higher than 40° F.

Another advantage of the gas treatment provided by our discovery is the simplification and reduction in size of the extraction towers required for the complete process system of this invention. Despite the two separate liquid injection stages and the additional extraction sections required over the single solvent system utilized by the dehydrating solvents of the prior art, due to the improved tray efficiency of the N-alkyllactams of this invention and particularly of the N-methyl pyrrolidone, there results a considerable reduction in capital investment for equipment over the installations utilizing glycols for dehydration.

The process of this invention will be more particularly described and its advantages made apparent by reference to the drawing of which.

Figure 1:
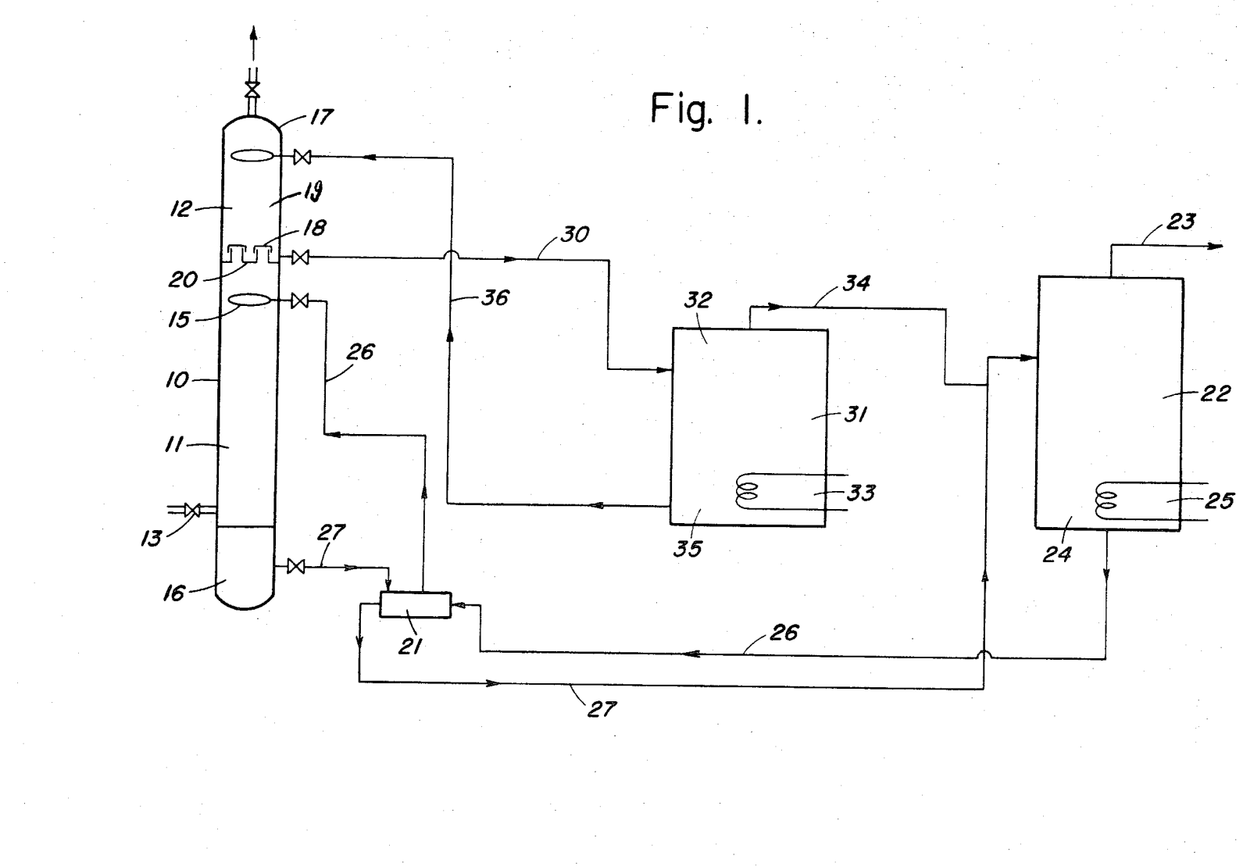
FIG. 1 shows a schematic flow diagram of a dehydration plant wherein the liquid N-alkyllactam (referred to by the preferred species, N-methyl pyrrolidone) is utilized as the primary dehydrating material for treating the gas stream and where any entrained N-methyl pyrrolidone is then recovered from the gas stream by the absorber solvent therefore (referred to by a suitable absorber, triethylene glycol) in a separate recovery stage and both are then recovered and recycled

Referring specifically to FIG. 1, the gas stream is treated with the N-methyl pyrrolidone in a double-section absorber column 10 within which the contacting of the gas stream and the N-methyl pyrrolidone takes place in a primary absorption section 11. The gas stream is led into this primary absorption section 11 of column 10 via gas stream entry portal 13. In the primary absorption section 11, the N-methyl pyrrolidone is introduced via sprays 15 and after complete and intimate countercurrent contacting of the rising gas stream with the downwardly flowing N-methyl pyrrolidone, the resulting N-methyl pyrrolidone/water absorbate is collected at the bottom of the primary absorption section 11 in the collection section 16.

The primary absorption section 11 may consist of either a packed column or a series of bubble trays to insure complete and intimate contacting of the gas stream with the N-methyl pyrrolidone. The primary absorption section 11 may also consist of an unpacked tower into which the gas is introduced into the lower section and the N-methyl pyrrolidone is sprayed down through the ascending gas.

In the course of the contacting of the N-methyl pyrrolidone and the gas stream, a small amount of the N-methyl pyrrolidone is entrained by the gas stream leaving the primary absorbing section 11 through bubble plate 20. At bubble plate 20, the dewpoint of the gas stream is about 80° F. below that of the incoming gas. The dried gas stream from the bubble plate 20 enters into the secondary absorption section 12 of absorber column 10 where the gas stream containing the entrained N-methyl pyrrolidone is intimately contacted with the triethylene glycol absorber which is introduced into the secondary absorber section 10 via spray 17. The secondary absorption section 12 also may be either a packed or unpacked tower or contain the conventional trays or packing media normally utilized for intimately contacting liquids with gases. The triethylene glycol introduced at spray 17, after proceeding in a countercurrent fashion through the gas stream containing the entrained N-methyl pyrrolidone, absorbs and removes substantially all of the N-methyl pyrrolidone from the gas stream and the triethylene glycol with the absorbed N-methyl pyrrolidone collects at the bottom of the secondary absorption section 12 in absorbate collection section 18 above bubble plate 20. The gas stream, from which all of the entrained N-methyl pyrrolidone has been removed, leaves the column 10 via gas stream exit portal 14 for either further treatment or transportation via pipeline.

The N-methyl pyrrolidone, containing the water removed from the gas stream, collects in N-methyl pyrrolidone collection section 16, is pumped via piping line 27 to an optional power recovery unit and heat exchanger 21 for pressure reduction and/or pre-heating, if necessary, and from there to the N-methyl pyrrolidone regenerator 22. The N-methyl pyrrolidone regenerator 22 may be a still, or similar apparatus wherein the water and other impurities absorbed by the N-methyl pyrrolidone are distilled therefrom by heat source 25. The water and other impurities in the overhead are led from the regenerator 22 via exit portal 23.

Any sour components of the overhead, i.e., $H_2S$ mercaptans and carbonyl sulfide, are collected and treated to prevent air pollution; any absorbed hydrocarbons are also separated and may be burnt as heat sources for the process or as liquid products. The water is vented in either gas or liquid form. The regenerated and purified N-methyl pyrrolidone collected in collection sump 24 of regenerator 22 is led via N-methyl pyrrolidone injection line 26 through the optional power recovery unit and heat exchanger 21 to the N-methyl pyrrolidone spray section 15 where it is reintroduced at the top of the primary absorption section 11 into absorber column 10. In the optional power recovery unit and heat exchanger unit 21, the contents of the N-methyl pyrrolidone/water piping line 27, may be used to cool and/or repressurize the purified N-methyl pyrrolidone in injection line 26, on its way to the spray section 15.

The triethylene glycol with absorbed N-methyl pyrrolidone which accumulates at collection section 18, is led via absorbate line 30 to the triethylene glycol reconcentrator 31 where the triethylene glycol absorbate is heated, by heater 33, to distill the absorbed N-methyl pyrrolidone from the triethylene glycol. The distillate from section 32 containing the N-methyl pyrrolidone is led via overhead line 34 through a vapor pump and joins N-methyl pyrrolidone/water piping line 27 near the intake where it is introduced into regenerator 22 whereby this N-methyl pyrrolidone portion is also purified. The triethylene glycol, after removal of the N-methyl pyrrolidone in the reconcentrator 31, is collected at the lower portions in the reconcentrator at a sump 35 from where it is led via pipeline 36 to the triethylene glycol spray section 17 and reintroduced into secondary contacting section 19 of absorber tower 10.

Figure 2:
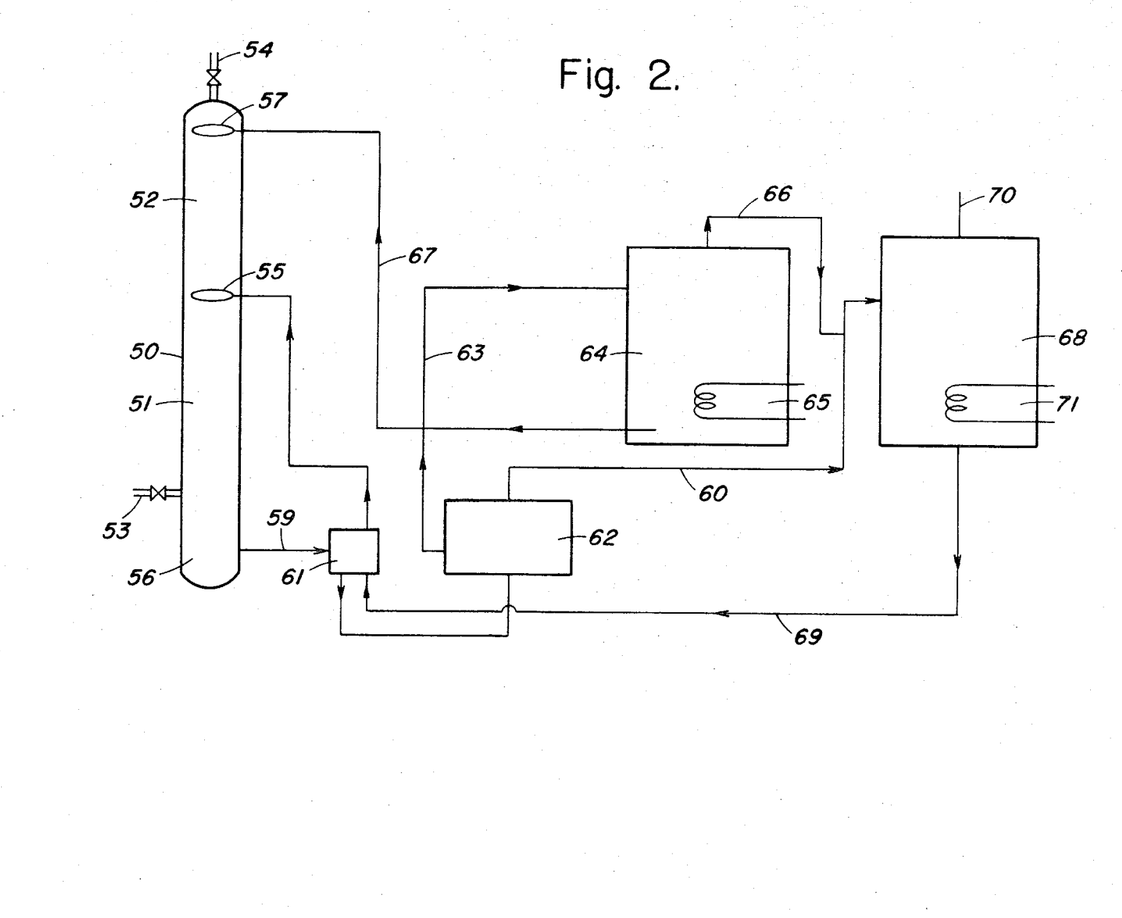
FIG. 2 shows a schematic flow diagram of a similar plant according to this invention wherein the triethylene glycol after its absorption from the gas stream of the entrained N-methyl pyrrolidone is permitted to mix with the primary accumulation of N-methyl pyrrolidone and a single-stage collection system is used for the N-methyl pyrrolidone mixed with the triethylene glycols. The mixture is then purified by removal of the water and then the absorber and the N-methyl pyrrolidone are separated, regenerated and each recycled.

With regard to FIG. 2, the process therein is simplified from that of FIG. 1, in that the triethylene glycol is collected together with the N-methyl pyrrolidone used for the dehydration of the gas stream. It is separated from the N-methyl pyrrolidone only in amounts sufficient for absorbing the entrained N-methyl pyrrolidone. This reduces the amount of piping. This can be done since the triethylene glycol is completely miscible and compatible with the N-methyl pyrrolidone. It is applicable to other miscible solvent absorber systems.

As illustrated in FIG. 2., the gas stream is initially dehydrated by the N-methyl pyrrolidone in absorption column 50 in a primary absorption section 51. Within this primary absorption section 51, the gas stream, introduced at the lower end via entry portal 53, flows countercurrent to the N-methyl pyrrolidone which is introduced preferably by sprayers 55 at the upper portion of the primary absorption section 51. The primary absorption section 51 may also have any of the commonly used devices for effectively contacting liquids with gases including tower packings and bubble trays. The gas stream is substantially and effectively dehydrated by the N-methyl pyrrolidone which then collects at the bottom of column 50 in collection section 56. The gas continues flowing in its upward direction and passes from the primary absorption section 51 to the secondary absorption section 52 for contact with the triethylene glycol. The triethylene glycol is introduced into column 50 at the top end of the secondary absorption section 52 via triethylene glycol spray 57 and flows downwardly countercurrent to the gas stream. In secondary absorption section 52 any N-methyl pyrrolidone entrained in the gas stream is absorbed as provided by this invention.

The triethylene glycol, containing the absorbed N-methyl pyrrolidone, continues its downward flow countercurrent to the gas stream through the primary absorption section 51 and finally accumulates in the collection section 56 where it mixes with the previously collected N-methyl pyrrolidone and water. The gas stream, introduced at entry portal 53, after flowing from the bottom of column 50 and having been extracted of its water and other N-methyl pyrrolidone-soluble components in absorption section 51 and having had any entrained N-methyl pyrrolidone and residual water removed in extraction section 52 then leaves column 50 at its upper end via exit portal 54 in a dehydrated condition.

The mixture of the N-methyl pyrrolidone, its absorbed natural gas components, water and other dissolved impurities and the absorber which have collected in collection section 56, is led via line 59 through an optional power recovery and/or heat exchanger 61, where it is depressurized and heated to holding tank 62. From tank 62, a portion of this mixture is led via line 63 to the triethylene glycol reconcentrator 64. In the reconcentrator 64, heat from heat source 65 is applied to distil from the higher boiling triethylene glycol solvent, the lower boiling N-methyl pyrrolidone, water and any natural gas components which the N-methyl pyrrolidone had absorbed. The mixture of N-methyl pyrrolidone, water and the sour components in liquid or vapor form is then led via line 66 to the regenerator 68. The remaining triethylene glycol in the reconcentrator 64, freed from its lower boiling absorbates, is then repressurized and led via line 67 back to the triethylene glycol spray 57 at the head of the absorption column 50.

The remaining portion of the mixture in holding tank 62 is pumped via line 60 from holding tank 62 to regenerator 68. In the regenerator 68, the mixture heated by heat source 71 to a temperature at which the water and the absorbed lower-boiling impurities such as $H_2S$, $CO_2$, COS and hydrocarbons are distilled and removed via line 70. The residual, thus purified, the N-methyl pyrrolidone and triethylene glycol mixture is then returned via line 69 to sprayer 55 of the primary absorption section 51 of absorption column 50.

The small amount of triethylene glycol in the N-methyl pyrrolidone has not been found to materially interfere with the dehydration capacity of the N-methyl pyrrolidone.

The term "impurities" as used in this description merely describes those materials in the gas stream which are subject to the primary absorption by the N-methyl pyrrolidone. The term, as used, carries no implication other than that such materials are removed together with the water from the gas stream by absorption via the N-methyl pyrrolidone. While the operation of the apparatus has been specifically described using N-methyl pyrrolidone and triethylene glycol, as set forth, any of the liquid N-alkyllactams previously described, may be substituted for the N-methyl pyrrolidone and any of the previously listed absorbers meeting the boiling point requirements may be substituted for the triethylene glycol. Two or more miscible absorbers as listed above, that are also mutually miscible with the N-lower alkyllactam may also be used.

The terms "solvents" and "absorbers" are used broadly herein. In fact, there may be either a physical solution of the lactam in the solvent or merely a physical mixture of the two completely miscible substances. The need for such a broad usage of the terms arises as the N-methyl pyrrolidone and other of the lighter lactams, do not form azeotropic mixtures with many of the absorber solvents useful in this invention and therefore their status as absorbents or solvents is a matter of semantics.

The method for the contacting of the gases to be dehydrated with the N-lower alkyllactams may be any of those classically used for efficiently contacting gases and liquids including bubbling the gas stream through the liquid, spraying the liquid into the gas stream, using countercurrent contacting towers or columns, either conventionally packed or provided with plates or having spray heads for the introduction of the solvent at the top of the tower. The preferred system is the countercurrent tower with the choice of packing or number of trays determined by the throughput of natural gas, the viscosity of the lower alkyllactam, the degree of dehydration of the natural gas desired and the amounts of water and acidic components in the natural gas. By increasing the number of effective trays, it is possible to achieve even greater degrees of dehydration than are merely required by the parameters for economic pipeline transportation. Any method for achieving good contacting of gas with liquids which will permit absorption of the moisture from the gas by the liquid will serve and is considered equivalent for this process.

The method for contacting the gases containing the entrained N-lower alkyllactam with the solvent/absorbent therefor may similarly be any of those classically used for efficiently contacting gases and liquids as described above for the dehydration operation. Since the amount of material to be removed from the gas stream is much lower and its molecular weight relationship with the gas stream is of greater disparity, fewer trays need be used in this secondary absorption section of the column.

As mentioned above, not only do the N-lower alkyllactams remove the water from the natural gas stream, they also remove, depending upon the degree of contact, and the degree of saturation therewith, many other components of the natural gas. Such a removal is an ancillary benefit from the process of this invention. Such other components of the natural gas stream which are soluble in the N-lower alkyllactams and which are removed by the treatment of the natural gas stream therewith are the acidic components (sours) and the $C_3$ to $C_{10}$ hydrocarbons and aromatics which due to their vapor pressure are found in varying degrees in the natural gas stream. The N-lower alkyllactams absorb these from the gas stream. During the reconcentration and regeneration operation, the water, the acidic components and hydrocarbons are removed from the N-lower alkyllactam.

The hydrocarbons can be removed together with the water and may be salted out from the solvent by "salting" with solutions of aqueous electrolytes added to the solvent. The hydrocarbons may then be recovered. Such recovered hydrocarbons provide a convenient source of fuel for the distillation operation or for liquid products.

The distillation in the reconcentrators and the regenerators may take place at ambient pressures or at reduced pressures. For ease of separation, the absorber/-solvent at the pressure used should have a boiling point above that of the entrained N-lower alkyllactam. A 25° C. difference in boiling points is desirable and about 50° C. difference preferred, but closer boiling absorbers may be used in equipment that is provided with means to carefully control the pressures and temperatures for good separation.

Both the distilled N-lower alkyllactam and the reconcentrated absorber/solvent therefor, may then preferably be reintroduced into the main process to resume their original functions wherein the N-lower alkyllactam dehydrates natural gas and the solvent removes any entrained N-lower alkyllactam from the gas stream that has been dehydrated.

It is preferred that the N-lower alkyllactam be introduced into the gas stream for the primary absorption in substantially anhydrous form. It is preferred also that the absorber solvent be introduced into the gas stream in substantially anhydrous form as this sometimes increases the capacity to absorb the N-lower alkyllactam and also prevents the reabsorption of some moisture from the nonhydrous absorber/solvents into the gas stream.

Generally, it has been found that the amount of solvents needed to absorb the entrained N-lower alkyllactam in a natural gas dehydration operation is dependent upon the viscosity of the solvent, the tower packing and the rate of gas flow. Solvent rates for recovering vaporized and entrained lactams vary from at least 1 to 10 percent of the lactam flow rate, depending upon temperature, pressure, and liquid viscosity during natural gas dehydration operations.

EXAMPLE 1

In a wellhead unit for dehydrating natural gas utilizing the arrangement according to FIG. 1, natural gas was treated at a rate of 4,000,000 scf/day at 800 psig and 70°–80° F. The gas was substantially saturated with water (38–40 lbs./MMscf). The gas was introduced via entry portal 13 into the primary absorption section 11 of column 10, which was provided with eight bubble trays having an estimated theoretical tray efficiency of 75 percent. Substantially dry N-methyl pyrrolidone(-circa 1 wt percent water) was injected at the top of primary absorption section 11 via spray 15. The injection was at the rates set forth in Table 1 below which also lists the resultant dewpoint depression and water content of the exit gases entering secondary absorption section 12 resulting from the corresponding injection rate.

TABLE 1

| Gallons N-methyl pyrrolidone/MMscf | Dewpoint depression degrees farenheit | Pounds Water/ MMscf of Exit Gas |
|---|---|---|
| 11.2 | 56 | 6.2 |
| 11.7 | 56 | 6.5 |
| 15.1 | 68 | 3.9 |
| 19.0 | 75 | 2.9 |

The dried gas leaving primary absorption section 12 would contain approximately 15 to 25 lbs. of N-methyl pyrrolidone per day.

Triethylene glycol (TEG) was introduced into the dried gas stream at a rate of about 1 gallon/MMscf, or about 5–10 percent of the amount of N-methyl-2-pyrrolidone being circulated. The TEG was injected at the top of secondary absorption section 12 which was fitted with three bubble trays to ensure good countercurrent contact of the triethylene glycol with the gas stream containing the entrained N-methyl pyrrolidone. Exit gas stream at exit portal 14 would contain less than 1 pound/day of N-methyl pyrrolidone. Less than 2.5 to 5 pounds/day would be lost in the entire plant.

The reconcentrator 31 for the triethylene glycol was one of vacuum distillation at a temperature range of 375°–400° F. The regenerator 22 for the N-methyl pyrrolidone was operated at 5–10 psig and at a temperature range of 300°–350° F.

The entire operation was compared to a conventional eight tray triethylene glycol field dehydration unit and it was found that due to the lower viscosity and more selective solvent action of the N-methyl pyrrolidone as compared to triethylene glycol, the amount of N-methyl pyrrolidone needed to treat the gas to meet commercial pipeline specifications of 7 lbs. of water/MMscf was less than half that required in the triethylene glycol dehydration unit. Further, less than half of the fuel and power requirements of the conventional equipment was needed to operate the plant according to the process of this invention. It was also found that N-methyl pyrrolidone was more easily regenerated. The N-methyl pyrrolidone had lower heat requirements due to its inherent lower boiling point, viscosity and molecular weight which also yielded power-saving dividends. Further, some of the required energy was derived from the hydrocarbons extracted in the N-methyl pyrrolidone-water mixtures recovered from the regenerator overhead. This also provided an economic advantage to the process of this invention.

EXAMPLE 2

In a unit, similar to that utilized in Example 1 and operating the N-methyl pyrrolidone as the primary dehydrating agent, dry N-cyclohexyl-2-pyrrolidone was substituted for the triethylene glycol as the absorber liquid for entrained N-methyl pyrrolidone. The N-cyclohexyl pyrrolidone was fully equivalent to the triethylene glycol as an absorber for the N-methyl pyrrolidone. The dewpoint of the exit gas can be lowered an additional 5° F. by the passage through the N-cyclohexyl pyrrolidone solvent/absorber which is also an excellent dehydrating agent.

The reconcentrator for the N-cyclohexyl-2-pyrrolidone was operated at 375°–400° F. and under a moderate vacuum.

EXAMPLE 3

Natural gas was introduced at the same temperatures and pressures as in Example 1 were treated by replacement with the following N-alkyllactams:

N-ethyl pyrrolidone
N-p-butyl pyrrolidone
N-isopropylpiperidone

The entrained N-alkyllactams were absorbed by N-cyclohexyl pyrrolidone and effective dehydration was achieved.

EXAMPLE 4

Moist gas from a wellhead at 80° F. and 800 psig was fed into dehydration apparatus according to FIG. 2. The natural gas was first dehydrated by the N-methyl pyrrolidone introduced by spray head 55 in the primary absorption section 51 of column 50. The N-methyl pyrrolidone containing the absorbed water was collected at the bottom of the column 56. The N-methyl pyrrolidone entrained in the gas stream was then absorbed by triethylene glycol introduced via spray head 57 at the upper portion of secondary absorption section 52. The triethylene glycol containing the absorbed N-methyl pyrrolidone was then permitted to descend through primary absorption section 51 to the bottom of the column 50 to collection area 56 where it accumulated with the N-methyl pyrrolidone/water mixture. This mixture of N-methyl pyrrolidone, triethylene glycol and water was then led to the reconcentrator and regenerator sections of the apparatus. Once the plant was started up, the N-methyl pyrrolidone became admixed with a portion of triethylene glycol. The proportions of these materials in the mixture after continuous operation became fairly constant. At the feed rates of N-methyl pyrrolidone and triethylene glycol to yield natural gas having a pipeline acceptable dewpoint, an N-methyl pyrrolidone/triethylene glycol ratio of approximately 10 to 1 was achieved. The presence of the triethylene glycol in the N-methyl pyrrolidone did not materially affect the efficiency of the dehydration by the N-methyl pyrrolidone. Dewpoints equivalent to that found in Example 1 were achieved.

EXAMPLE 5

N-cyclohexyl pyrrolidone was substituted for the triethylene glycol in Example 4 with approximately the same efficiency of operation. It should also be noted that N-methyl pyrrolidone and N-cyclohexyl pyrrolidone mixture had a lower viscosity and higher tray efficiency than the mixture of N-methyl pyrrolidone and triethylene glycol.

EXAMPLE 6

In a plant, according to Example 1 or 4 charged with N-methyl pyrrolidone as the dehydrating agent, the following absorber liquids were utilized for the absorption of entrained N-methyl pyrrolidone:

Tetraethylene glycol
Triethylene glycol/triethanolamine mixture 1:1
Glycerin
Methoxy polyethylene glycol (Circa 350)

In each of these cases, each of the absorbers substantially removed all the N-methyl pyrrolidone entrained by the gas stream.

EXAMPLE 7

A syngas (shifted) gas produced by the partial oxidation of heavy crude or residual oils and containing high-pressure hydrogen for hydro-cracking or ammonia synthesis was compatible with liquid and apparatus according to FIG. 1. The gas from the generating unit, saturated at 1,070 psig/90° F. with water vapor, 44 lbs./MMscf was introduced into absorber column 10 where it was dehydrated and its $CO_2$ content reduced by an N-methyl pyrrolidone stream in the manner set forth in Example 1 for natural gas. Any entrained N-methyl pyrrolidone was removed from the dehydrated gas by a wash with N-cyclohexyl pyrrolidone.

The syngas was introduced into the apparatus at a flowrate of 100 MMscf/day and a pressure of 1,070 psig 90° F. The water-saturated syngas introduced into the apparatus and the gas flowing from the apparatus after dehydration and treatment with N-methyl pyrrolidone had the following approximate compositions (volume STP %):

|  | Feed Gas | Treated Gas |
|---|---|---|
| $H_2$ | 64.53 | 96.44 |
| $CO_2$ | 33.15 | 0.10 |
| CO | 1.50 | 2.24 |
| $C_1$ | 0.44 | 0.59 |
| $N_2$ + Ar | 0.38 | 0.63 |
| $H_2O$ Dewpoint | >80°F. | <0°F |

The N-methyl pyrrolidone was circulated at a rate of 9,500 gallons/minute and the circulation of the N-cyclohexyl pyrrolidone in the absorber unit was 400 to 800 gallons/minute. During the dehydration and $CO_2$ removal step, approximately 20 to 40 lbs./hour of N-methyl pyrrolidone was entrained by the syngas. After treatment with the N-cyclohexyl pyrrolidone, the N-methyl pyrrolidone losses were reduced to 2 to 4 lbs./hour. There was even less loss of N-cyclohexyl pyrrolidone. The operating temperatures of both the regenerator and reconcentrator were as set forth in Example 2.

EXAMPLE 8

Using the apparatus as shown in FIG. 1, a gas saturated with water at 800 psig and 80° F. and containing 10 grains of $H_2S$/100 scf was simultaneously sweetened and dried to better than pipeline specifications of 0.25 grams sulfur per 100 scf and dewpoint of 0° F. The primary absorption section was fitted with 20 trays and the N-methyl pyrrolidone was introduced at a rate of 5 gal./minute per MMscf/day of gas flow. The secondary absorption section was fitted with five trays and the triethylene glycol was introduced at a rate of 0.5 gallons/minute per MMscf/day. Under these conditions, the loss of N-methyl pyrrolidone was kept below about 1 pound per MMscf.

What is claimed is:

1. A method for the enhanced dehydration of wet gas streams by solvent absorption with minimal loss of dehydrating solvent comprising:

a. contacting a water vapor-containing gas stream with a liquid N-alkyllactam solvent in the dehydration section of a contacting zone, said alkyllactam solvent absorbing water vapor from said gas stream to dehydrate said stream;

b. passing the thus-dehydrated gas stream from said dehydration section into the scrubber section of said contacting zone for contact therein with an absorber liquid in an amount constituting a relatively minor proportion of the amount of liquid solvent employed in the dehydration section, said absorber liquid consisting essentially of a solvent or mixture of solvents for said N-alkyllactam and having a boiling point higher than that of said N-alkyllactam, said absorber liquid absorbing and recovering vaporized and/or entrained N-alkyllactam solvent present in the dehydrated gas stream passing from said dehydration section to said scrubber section of the contacting zone;

c. withdrawing said liquid N-alkyllactam solvent having water vapor absorbed therein from said dehydration section;

d. withdrawing said absorber liquid having recovered N-alkyllactam solvent absorbed therein from said scrubber section;

e. regenerating and reconcentrating said withdrawn N-alkyllactam solvent for recycling to said dehydration section of the contacting zone;

f. regenerating and reconcentrating said withdrawn absorber liquid for recycling to the scrubber section of the contacting zone, the N-alkyllactam solvent thereby removed from the absorber liquid being recycled to the dehydration section of the contacting zone; and g. withdrawing a dehydrated gas stream from the scrubber section of the contacting zone, said gas stream having substantially all of the vaporized and/or entrained N-alkyllactam content of the gas stream passed from the dehydration section to the scrubber section removed therefrom, whereby the effective recovery of N-alkyllactam solvent in the scrubber section does not adversely effect the degree of dehydration achieved in the dehydration section, so that enhanced gas stream dehydration is achieved in the contacting zone with minimal loss of N-alkyllactam solvent, the N-alkyllactam solvent and absorber liquid both being conveniently and efficiently regenerated for contact with additional quantities of the wet gas stream to be dehydrated.

2. The method according to claim 1 wherein the gases are fuel gases.

3. The method according to claim 1 wherein the gases are syngas.

4. The method according to claim 1 wherein the liquid N-alkyllactam is N-methyl pyrrolidone.

5. The method according to claim 1 wherein the absorber liquid is N-cyclohexyl pyrrolidone.

6. The method according to claim 1 wherein the N-alkyllactam containing the absorbed water and the absorber liquid with the dissolved N-alkyllactam contained therein are collected together.

7. The method according to claim 1 wherein the N-alkyllactam used for contacting the gas containing water includes up to 20 percent of the absorber liquid for said N-alkyllactam.

8. The method according to claim 1 wherein in addition to the dehydrating of the gases, the gases are additionally purified by having removed therefrom those contaminants of the gas which are soluble in the N-alkyllactam, said contaminants including sulfur-containing sour components, carbon dioxide, and entrained heavy hydrocarbons.

9. The method according to claim 1 applied to natural gas issuing from the wellhead and simultaneously dehydrating and sweetening same to commercial pipeline standards prior to injection into the pipeline for transport.

10. The method of claim 1 in which the gas stream to be dehydrated is passed upwardly through the dehydration section of the contacting zone for countercurrent contact therein with a descending stream of said liquid N-alkyllactam solvent.

11. The method of claim 10 in which the dehydrated gas stream in the dehydration section passes directly upward therefrom into the scrubber section of the contacting zone for countercurrent contact therein with a descending stream of said absorber liquid.

12. A method for the enhanced dehydration of wet gas streams by solvent absorption with minimal loss of dehydrating solvent comprising:

a. contacting a water vapor-containing gas stream with a liquid N-alkyllactam solvent in the dehydration section of contacting zone, said alkyllactam solvent absorbing water vapor from said gas stream to dehydrate said stream;

b. passing the thus-dehydrated gas stream from said dehydration section into the scrubber section of said contacting zone for contact therein with an absorber liquid in an amount constituting a relatively minor proportion of the amount of liquid solvent employed in the dehydration section, said liquid containing a solvent or mixture of solvents for said N-alkyllactam, said absorber liquid consisting essentially of a liquid polyethylene glycol or mixture thereof having a boiling point higher than that of said N-alkyllactam solvent, said absorber liquid absorbing and recovering vaporized and/or entrained N-alkyllactam solvent present in the dehydrated gas stream passing from said dehydration section to said scrubber section of the contacting zone;

c. withdrawing said liquid N-alkyllactam solvent having water vapor absorbed therein from said dehydration section;

d. withdrawing said absorber liquid having recovered N-alkyllactam solvent absorbed therein from said scrubber section;

e. regenerating and reconcentrating said withdrawn N-alkyllactam solvent for recycling to said dehydration section of the contacting zone;

f. regenerating and reconcentrating said withdrawn absorber liquid for recycling to the scrubber section of the contacting zone, the N-alkyllactam solvent thereby removed from the absorber liquid being recycled to the dehydration section of the contacting zone; and g. withdrawing a dehydrated gas stream from the scrubber section of the contacting zone, said gas stream having substantially all of the vaporized and/or entrained N-alkyllactam content of the gas stream passed from the dehydration section to the scrubber section removed therefrom, whereby the effective recovery of N-alkyllactam solvent in the scrubber zone does not adversely affect the degree of dehydration achieved in the dehydration section, so that enhanced gas stream dehydration is achieved in the contacting zone with minimal loss of N-alkyllactam solvent, the N-alkyllactam solvent and absorber liquid both being conveniently and efficiently regenerated for contact with additional quantities of the wet gas stream to be dehydrated.

13. The method of claim 12 in which the absorber liquid is selected from the group consisting of di-, tri- and tetra ethylene glycol and mixtures thereof.

14. The method of claim 13 in which said glycol is triethylene glycol.

15. The method of claim 12 in which said N-alkyllactam solvent is N-methyl pyrrolidone.

16. The method of claim 15 in which said absorber liquid is selected from the group consisting of di-, tri- and tetra ethylene glycol, and mixtures thereof, and N-cyclohexyl pyrrolidone.

17. The method of claim 16 in which said absorber liquid is triethylene glycol.

18. The method of claim 16 in which said absorber liquid is N-cyclohexyl pyrrolidone.

* * * * *